June 12, 1934.    H. C. BLODGETT    1,962,475
OVERHEAD DOOR CONTROL MEANS
Filed Sept. 19, 1930    2 Sheets-Sheet 1

INVENTOR
Herbert Cady Blodgett
BY
ATTORNEYS

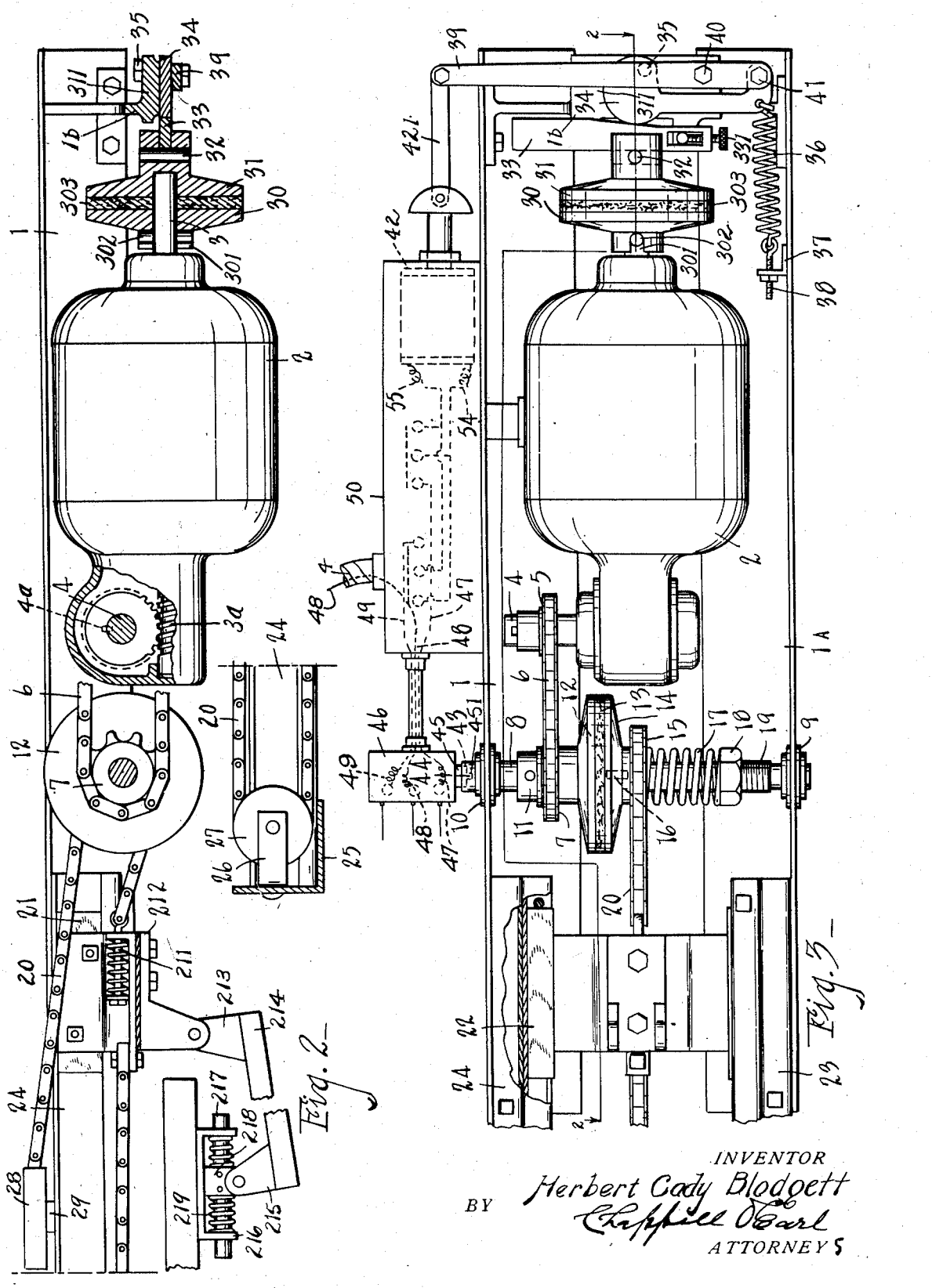

Patented June 12, 1934

1,962,475

UNITED STATES PATENT OFFICE 1,962,475

OVERHEAD DOOR CONTROL MEANS

Herbert Cady Blodgett, Hartford City, Ind., assignor to Door Control Company, Hartford City, Ind.

Application September 19, 1930, Serial No. 483,007

2 Claims. (Cl. 268—59)

This invention relates to electric controls especially adapted for overhead doors or the like, the control, however, being adapted for use on any kind of door or gate and on an elevator or 5 for similar service.

The objects of the invention are:

First, to provide an improved construction and arrangement of electric motor control and connection for the operation and control of the 10 usual construction of overhead door.

Second, to provide in such a combination an electric motor with worm gear reduction means.

Third, to provide in such a structure a motor with an improved brake control for stopping the 15 same.

Fourth, to provide an improved cushion connection for the actuating connection between a control carriage and an overhead door.

Objects pertaining to details will appear from 20 the description to follow.

A preferred embodiment of my invention is illustrated in the accompanying drawings, in which:

Fig. 2 is an enlarged detail side elevation view in separated and broken sections, taken in part 30 on line 2—2 of Fig. 3, showing the mounting frame, motor, driving sprocket wheels and an outline of the clutch mechanism, the control tracks attached to said frame, idler sprocket wheel, and front spreader.

Figures 1, 4, 5, 6:
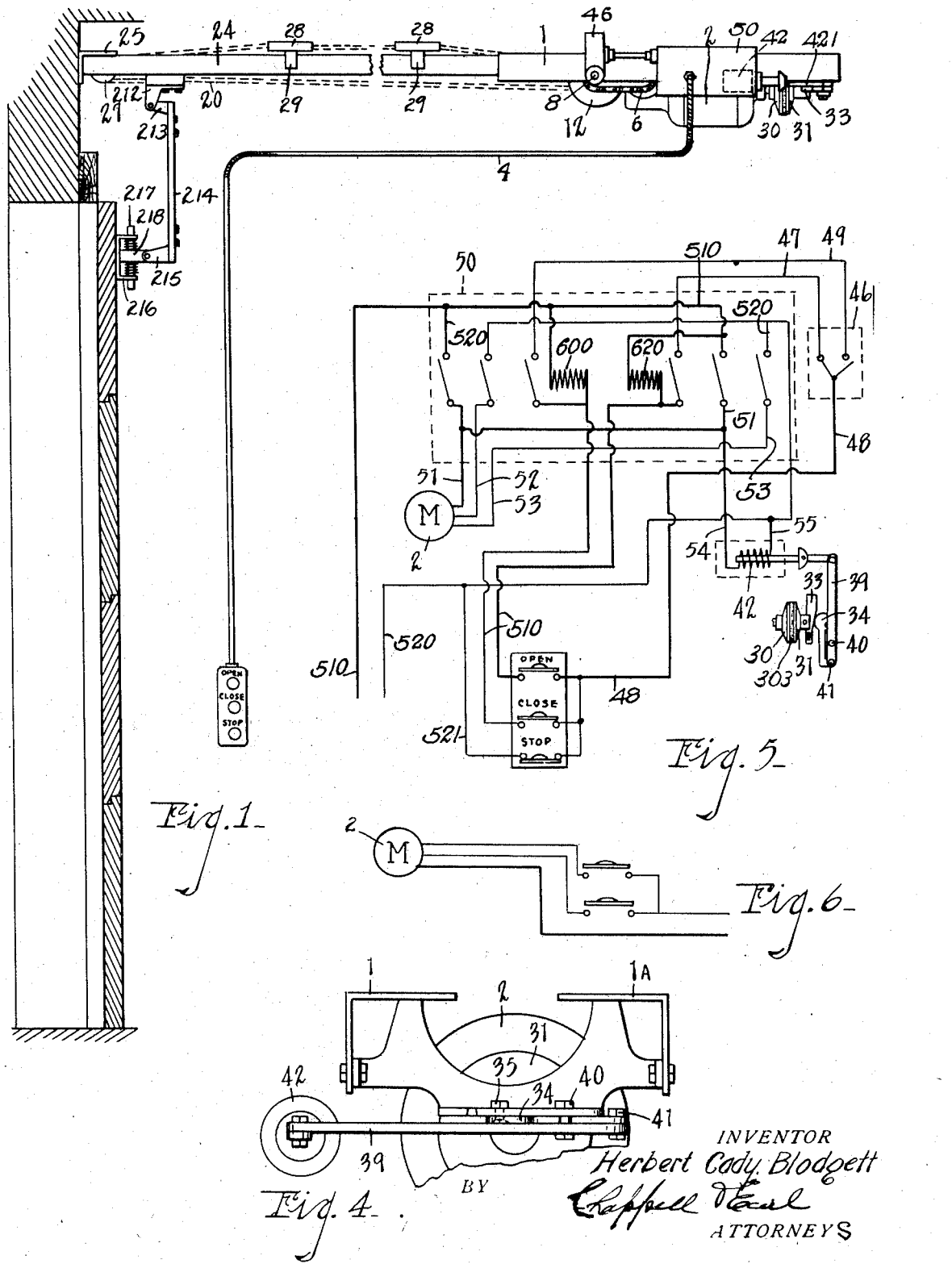
Fig. 1 is a diagrammatic detail side elevation 25 view of my improved door and electric control connected to an overhead door shown diagrammatically with the door in section.

35 Fig. 3 is an inverted plan view of the same mechanism as illustrated in Fig. 2, showing the reversing cross line magnetic switch, limiting switch and solenoid operated brake mechanism, the front sprocket wheel and support being 40 omitted.

Fig. 4 is an enlarged detail end elevation from the right hand end of Figs. 1, 2 and 3, showing the motor and solenoid operated brake mechanism.

45 Fig. 5 is the wiring diagram, showing the relation of the magnetic switches, motor and brake operating solenoid.

Fig. 6 is a wiring diagram showing the simplest form of switches for control, the magnetic 50 switch and solenoid for the brake being omitted.

The parts will be identified by their numerals of reference which are the same in all the views.

1 and 1a are the supporting frames for the driving mechanism. 1b is the cross bracket 55 spreader support for side frames 1 and 1a. 2 is the motor. The gear reduction mechanism is here housed with the motor and comprises the motor shaft 3 on which is formed a worm 3a, see Fig. 2. 4 is the reduced gear shaft of the motor carrying worm gear 4a which is in mesh 60 with the worm 3a on the motor shaft 3. The gear ratio is thus readily controlled and greatly reduced to any extent desired.

5 is a sprocket wheel attached to said reduced gear shaft 4. 6 is the sprocket driving chain and 65 7 is the driven sprocket. 8 is the jack shaft on which said driven sprocket 7 is journaled. 9 and 10 are ball bearings supported by frame members 1 and 1a in which said jack shaft 8 revolves.

11 is a collar pinned to shaft 8, having a 70 smooth contacting surface disposed against the hub of sprocket wheel 7. It forms an immovable stop against which said sprocket wheel 7 may rotate.

Clutch disk 12 is secured to sprocket wheel 75 7 by a suitable hub or the parts may be made integral. Clutch disk 12 with sprocket wheel 7 is journaled and free to rotate upon the jack shaft 8 and is provided with a clutch means to drive the said jack shaft. Friction disk 13, 80 made of copper woven asbestos, is disposed next to the clutch disk 12. 14 is the cooperating clutch disk. To this disk 14 is securely attached (or made integral therewith) sprocket wheel 15. Clutch disk 14 with the said sprocket wheel 15 85 are slidably keyed to the shaft 8 by key 16 which serves to drive said shaft 8 whenever the clutch disk 14 with the said sprocket 15 are rotated.

17 is a coiled compression spring disposed against the face of the sprocket wheel 15 and is 90 adjustable thereagainst by the screw nut 18 which operates upon the screw thread 19 upon the shaft 8. By adjusting the nut 18, the tension on spring 17 can be varied and the clutch can be made to slip at any point of resistance 95 desired.

It will be seen that the disk 12 is actuated by means of the motor and that the driving power of disk 12 is imparted to the disk 14 by friction through the friction disk 13. Driving 100 sprocket 15 controls the chain 20 which in turn moves carriage 21 on its runners 22 and 22a. Tracks 23 and 24 are attached to the supporting members 1 and 1a, the front end of the tracks being carried by spreader 25 which is 105 attached to the wall at the outer or door end of the control mechanism.

26 is a bifurcated bracket attached to spreader 25. 27 is the idler sprocket wheel for chain 20. The upper run of this chain is carried 110 on bracket guides 28 28, supported on cross bars 29 on the tracks 23 24.

Carriage 21 is provided with spring bolt connection 211 for sprocket chain 20. Carriage 21 is also provided with hinge bracket 212 for connection to hinge member 213 carried by connecting link 214 which carries hinge member 215. A spring hinge bracket 216 is provided on the door, see Figs. 1 and 2. This has a bolt 217 with hinge member 218 at the center and coiled springs 219 219 at each side. It provides a cushion connection for the link in either opening or closing the door.

I provide automatic brake means to stop the motor when the current is cut off. Motor shaft 3 is extended to the rear of the motor. Clutch disk 30 with its hub portion slotted at 301 and engaging cross pin 302 is rotated with motor shaft 3 by means of said pin. The disk is thus free to slide on shaft 3. Friction disk 303 lies between rotating disk 30 and stationary disk 31, which is journaled on said shaft 3. Stationary disk 31 has a slotted hub with cross pin 32 passing through the hub of said disk 31 at right angles to said slot to afford a rocking contact for its lever actuating means.

33 is an adjustable swinging arm lying on flange 311 of supporting bracket 1b, passing through slotted hub of disk 31, and thereby holding said disk 31 against rotation and leaving it free to slide on shaft 3. This is wedge shaped and adjustable by set screw 331.

Cam arm 34 turns upon pivot center 35. Spring 36 is adjustably attached to bracket 37 by means of a threaded eye bolt 38, and at its opposite end to cam arm 34. Lever 39 is fulcrumed at 40, and actuates cam arm 34 through pivotal connection 41. Lever 39 is actuated by means of solenoid 42 which is connected thereto by link 421.

The action of this brake is clear. Spring 36 exerts a continuous pull upon cam arm 34, causing the cam portion to press against arm 33, which rests against pin 32, forcing disk 31 against the friction disk 30. The pressure thus exerted causes a braking effect upon rotating disk 30. The movement of lever 39 under the solenoid pull, releases the pressure of cam arm 34, thereby releasing the brake and leaving the motor free to rotate.

A limiting switch means is provided. The end of jack shaft 8 is recessed round for a little way in at the end at 43 and cross slotted at 44. Shaft 45 projects in recess 43 and is constructed with a tongue 451 thereon which fits into slot 44. The round recessed portion keeps shaft 45 concentric and in line with shaft 8. When the shaft 8 is rotated, shaft 45 also rotates at the same speed.

Outline 46 represents a diagrammatic drawing of a limit switch. This limit switch has a worm and worm gear driven by shaft 45, and it is so constructed that the turning of the gear makes and breaks circuits 47, 48 and 49 at predetermined periods.

50 is a diagram illustrating a cross line magnetic control switch, as to the details of which applicant has made no invention. The motor leads to the switch connect through a cable in the casing at the side of the motor. The connections from the limit switch are also encased. In Fig. 5 is the wiring diagram, the limit switch 46 being defined by dotted lines. The casing of the brake solenoid are also similarly defined as is the general casing of switch 50 for the cross line control switch.

Push buttons for control are shown diagrammatically in Fig. 1 and also in Fig. 5, there being a push button to "open" and a push button to "close" and another to "stop" the door or mechanism. One power line 510 leads to one side of the switch 50 and connects always to the motor line 51, no matter which part or portion of the switch may be operated. The other power line 520 leads to the stop push button by branch 521.

48 is a main line which leads through the limiting switch 46. This switch, when it cuts out one line, automatically connects the other, thus dividing the line 48 into auxiliary lines 47 and 49. These lines are connected to control the opposed relay magnets of the magnetic switch 50. When the right hand portion of switch 50 is operated by the pushing of the button to "open" one branch, the line operates the magnetic switch and when this is closed another branch of that power line connects through to the motor at 53, and when the closed switch button is operated the same branch connects through the left hand portion of the switch to the motor connection 52, thus reversing the motor.

It will be observed that it is only necessary to hold these push buttons down temporarily as the magnetic switch at once operates. When it operates it holds the switch until the limit switch breaks the circuit. It is then necessary to operate the other push button to "open" in order to get any effect.

If it is desired to stop the motor and the connected door at any point, the "stop" push button is depressed, which breaks the circuit and cuts off the power.

Fig. 6 shows the diagram for simple push button control. The power is not on unless a push button is depressed.

The operation of my improved door control will be readily understood. Suppose the door to be standing in the closed position as indicated in Fig. 1.

Power line 510 is connected (or common to) the left hand branch and the right hand branch of the cross line reversing switch 50. Solenoid 600 operates the left hand branch while solenoid 620 operates the right hand branch. Power line 520 is connected to the right and left hand branches.

Push button "open", when depressed, through solenoid 620 closes the right hand branch, thereby contacting power line 510 and motor line 51 and power line 520 to motor line 53, causing motor 2 to operate in the proper direction of rotation to open the door.

Push button "close", when depressed, through solenoid 600 closes the left hand branch, thereby contacting power line 510 and motor line 51, and power line 520 to motor line 52, causing the motor 2 to operate in the proper direction of rotation to close the door.

The energizing current operating solenoids 600 and 620 respectively is maintained constantly during the required time to open or close the door, by the third contact in each branch. The mechanical operation of limit switch 46 opens the circuit to either solenoid 600 or 620, thereby causing the motor to stop at the time the door is fully open or closed.

Push button "stop", when depressed, terminates the flow of current to either solenoid, thereby stopping the door at any desired point in its travel.

Lead 48 is from the push button station and not a true "hot" line, as it only carries current to the solenoid 620 (as drawn). The constant energy to said line 48 is supplied through the line 521 from the "stop" button which originates from power line 520.

As shown in Fig. 5 the door is closed, and depressing the "close" button would not have any effect, as one terminal of limit switch 46 is open. Depressing the "open" button will energize the solenoid 620, and cause the door to open. When opening operation is completed the opposite contact in limit switch 46 will be closed, thereby enabling the "close" button to be effective when depressed.

With the simple control as seen in Fig. 6, the push button to "open" is held down until the door is open and then released, and when it is desired to close the door, the opposite "close" push button is depressed and held down and the door closes.

Close adjustment is avoided by the spring bolt incorporated in the carriage and also by the spring hinge connection to the door. The door can be completely closed or completely open without extraordinarily close adjustment. The mechanism clearly can be used on all kinds of doors and gates, whether they slide in straight lines, or swing or travel on tracks in various directions and relations. An indefinite number of applications might be illustrated, but it is not deemed necessary to illustrate any except the preferred form.

No harm will be done by holding the switches closed because the clutch is set to pull only a few pounds more than the required effort to move the door. The clutch will slip when the door is completely closed or completely open, thus avoiding damage to the mechanism or the undue heating of the motor.

Having thus described my invention what I claim as new and desire to secure by Letters Patent is:

1. In an overhead door control means, the combination with an overhead door, of a motor frame comprising side bars and end support, an electric motor suspended therefrom provided with an internal reduction gear means consisting of a worm gear, a shaft therefor, a sprocket wheel carried by the shaft, a jack shaft parallel therewith, a collar on said jack shaft, a sprocket wheel having a clutch disk associated therewith journaled on the said shaft and a sprocket chain connection to the motor sprocket, a cooperating clutch disk having a sprocket wheel connected to the hub thereof and keyed to the said jack shaft and adapted to longitudinal adjustment thereon, a coil spring having an adjusting nut on the said jack shaft to adjust the tension on the said clutch, side rails connected to the said motor frame, a spreader for the front end thereof supported above the doorway, a sprocket wheel supported at the front thereof, a sprocket chain disposed over the said sprocket wheels, a carriage movable along said rails and connected to the opposite ends of said sprocket chain having a cushion spring connection interposed, a hinge bracket secured to the said carriage, a link hinged at one end thereto, a hinge member at the opposite end of said link, a yielding hinge member secured to the said door comprising a pivot block and a spring bolt having compression springs disposed each side of the said block, and electrical connections to the said motor.

2. In an overhead door control means, the combination with an overhead door, of a motor frame comprising side bars and end supports, an electric motor suspended therefrom provided with an internal reduction gear means consisting of a worm gear, a shaft therefor, a sprocket wheel carried by the shaft, a jack shaft parallel therewith, a collar on said jack shaft, a sprocket wheel having clutch disk associated therewith journaled on the said shaft and a sprocket chain connection to the motor sprocket, a cooperating clutch disk having a sprocket wheel connected to the hub thereof and keyed to the said jack shaft and adapted to longitudinal adjustment thereon, a coil spring having an adjusting nut on the said jack shaft to adjust the tension on the said clutch, side rails connected to the said motor frame, a spreader for the front end thereof supported above the doorway, a sprocket wheel supported at the front thereof, a sprocket chain disposed over the said sprocket wheels, a carriage movable along said rails and connected to the opposite ends of said sprocket chain having a cushion spring connection interposed, a hinge bracket secured to the said carriage, a link hinged at one end thereto, a hinge member at the opposite end of said link, and electrical connections to the said motor.

HERBERT CADY BLODGETT.